April 25, 1933.  L. B. HARRIS  1,905,588
VEHICLE SEAT
Filed Oct. 22, 1930   3 Sheets-Sheet 1

INVENTOR
LEONARD B. HARRIS
BY
Joseph Blacker
ATTORNEY

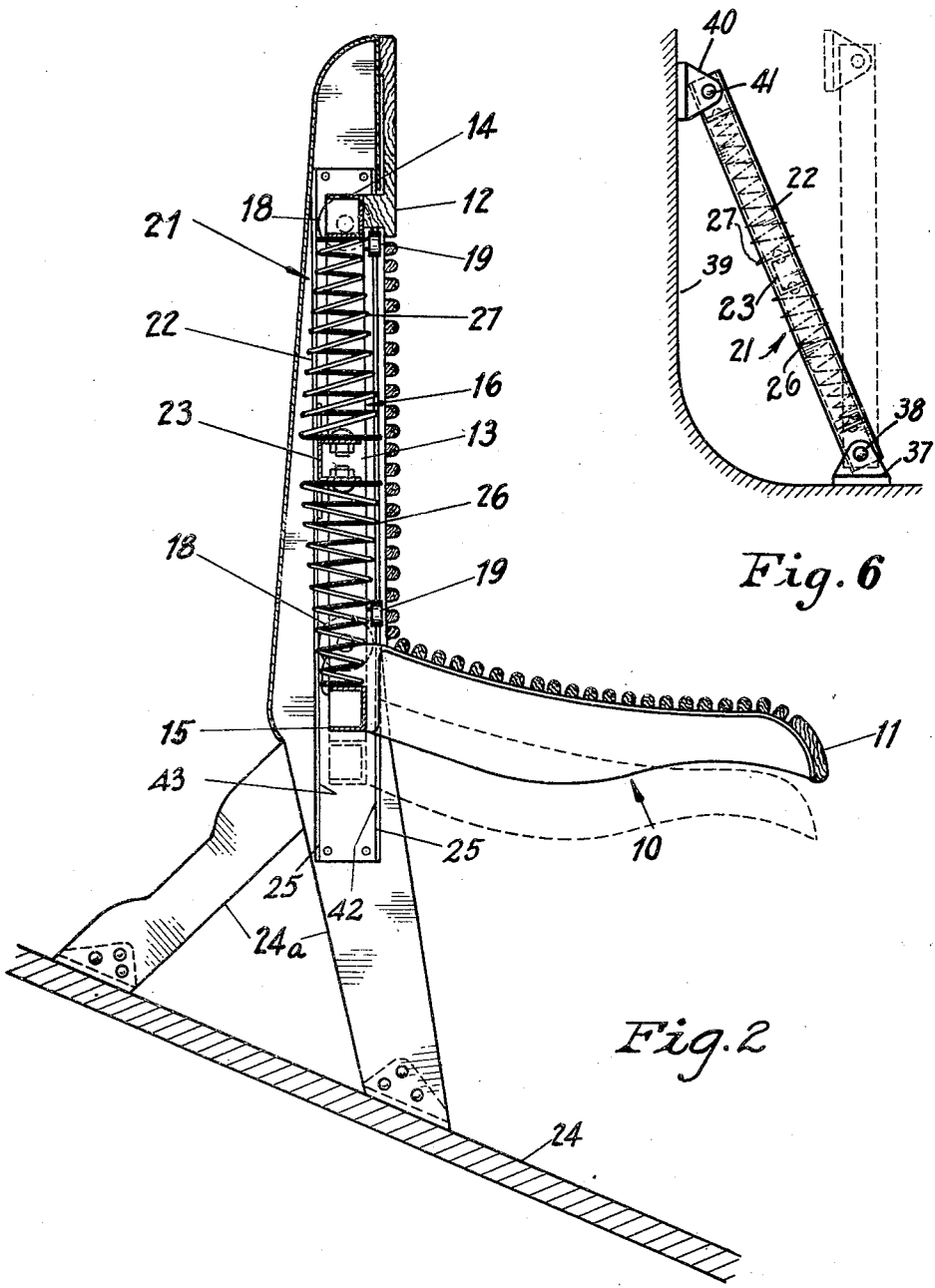

April 25, 1933.  L. B. HARRIS  1,905,588
VEHICLE SEAT
Filed Oct. 22, 1930  3 Sheets-Sheet 3
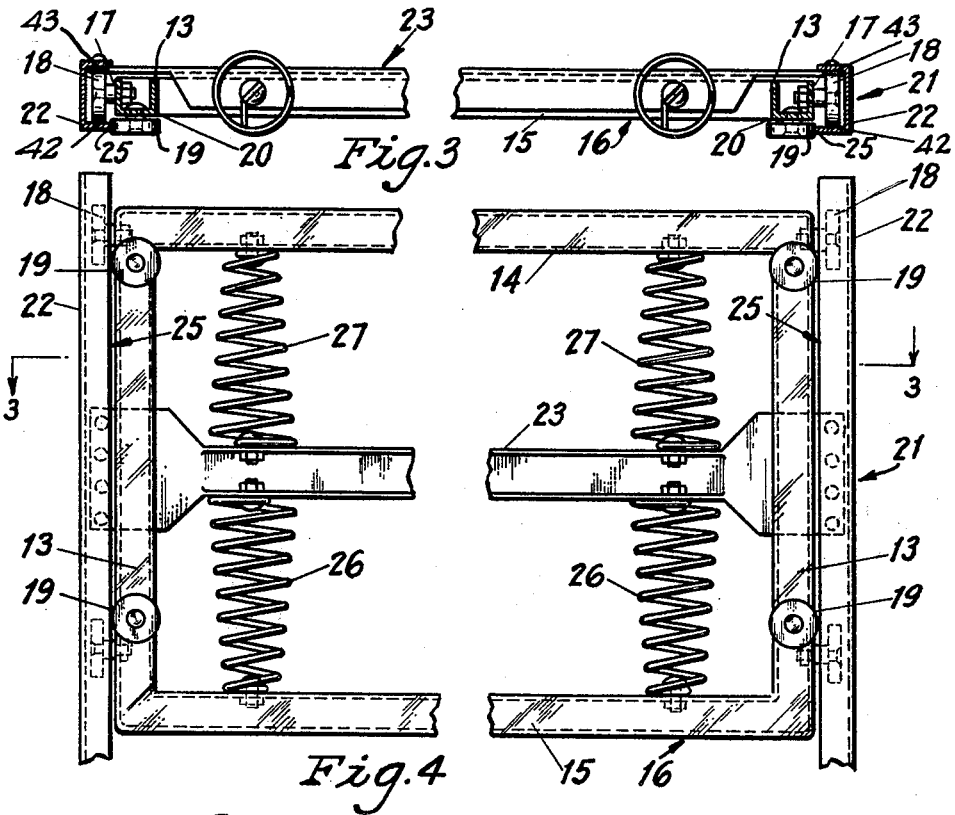
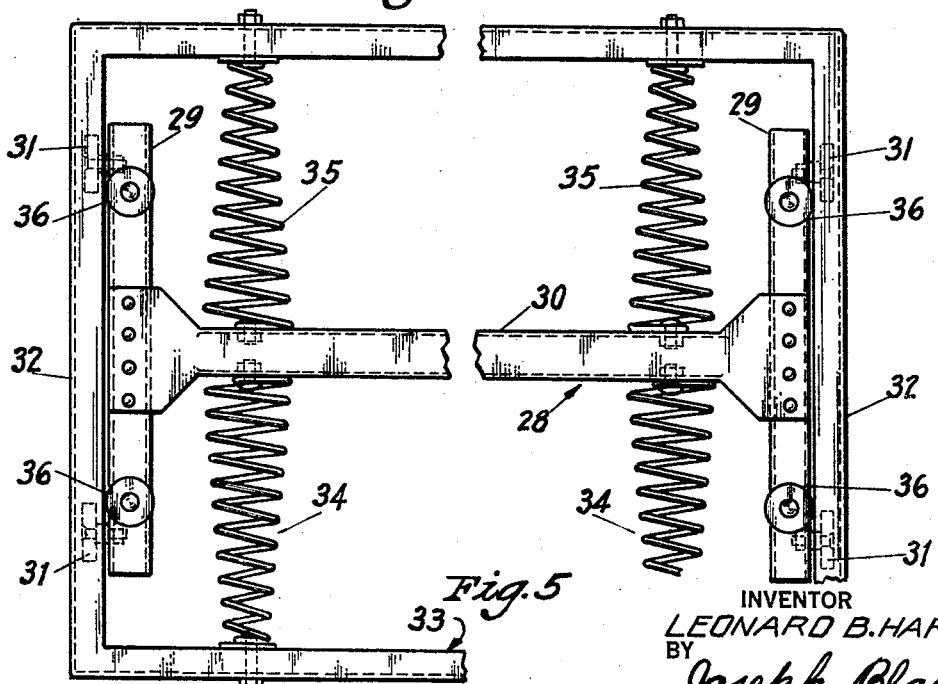
INVENTOR
LEONARD B. HARRIS
BY
Joseph Blacker
ATTORNEY Patented Apr. 25, 1933

1,905,588

UNITED STATES PATENT OFFICE

LEONARD B. HARRIS, OF NEW YORK, N. Y.

VEHICLE SEAT

Application filed October 22, 1930. Serial No. 490,429.

It is a recognized fact that with automobile seats as heretofore constructed with the back of the seat immovably fixed to the car body while the seat bottom and passenger move up and down, there results an unpleasant rubbing action of the passenger's back against the back of the seat when passing over bumpy roadways.

This invention relates to improvements in shockless multiple-passenger bench seats for vehicles, wherein the entire seat and back rest is built as a unit and is supported on springs which are adapted to neutralize the rebound effects ordinarily transmitted to the seat and passengers due to the up and down movements of the vehicle, thus supplementing the action of the vehicle springs and providing greater comfort to the passengers and also preventing any rubbing action on the passenger's back.

This invention is an improvement on my vehicle seat, Patent Number 1,767,757, dated June 24, 1930. This patented vehicle seat consists of a seat bottom pivotally connected to a vertically movable back-rest. I have found in actual practice that better results are obtained when the seat bottom and back-rest are built integrally and supported on springs as a non-pivoting unitary structure.

The main object of this invention is to provide an elongated multiple passenger bench seat and back rest frame resiliently supported and slidably mounted in relation to a stationary frame, one of said frames being a guide track frame and comprising two lateral guide tracks positioned in right-angular relation with two front and two rear guide tracks and the other frame being a roller carrying frame and comprising four rollers mounted diagonally at the corners of the front or rear face of said frame and in rolling engagement with said lateral guide tracks and four rollers mounted laterally on said roller carrying frame and in rolling engagement with said front and rear guide tracks, said resilient support comprising a plurality of longitudinally spaced and oppositely stressed upper and lower coil springs terminating in spaced horizontal planes, thereby jointly supporting the bench seat in a level plane and absorbing the downward thrust and neutralizing the rebound effects.

Another object of this invention resides in the particular arrangement of the cooperating springs, whereby the upper and lower springs are initially compressed and are under equal stress and are constantly opposed to each other and the resultant effect being a mutual dampening of the oscillations in both directions, thereby preventing violent or sudden oscillations.

Another object of this invention resides in the structural features of the stationary guide track frame and spring-supported seat, whereby the relative motion between the seat and stationary frame is facilitated and guided by the front and rear tracks at the four corners of the front and rear faces of the back-rest by means of roller bearings which are in rolling engagement with said tracks, and by means of four roller bearings mounted on the sides of the back-rest and in angular relation with the first mentioned roller bearings and in rolling engagement with the lateral tracks.

With these and other objects in view, the invention resides in the arrangement and combination of means for carrying out the correlated functions and in the particular provision, construction and operation of the parts hereinafter described and claimed. It being understood that the embodiments herewith shown are merely illustrative and that various changes in the form, proportion, size and minor details of construction may be resorted to without departing from the spirit of the invention as expressed in the appended claims.

Reference will now be had to the drawings, wherein like numerals of reference designate corresponding parts throughout the several views in which:

Figure 2 is a vertical section, the section being taken as on line 2—2 in Figure 1.

Figure 3 is a section taken as on line 3—3 in Figure 4.

Figure 4 is a front elevation of the stationary frame, and resiliently mounted therein is the movable back-rest frame.

Figure 5 is a front elevation of a modified form of stationary frame, and resiliently mounted therein is a modified back-rest frame.

Figure 6 is an end view of Figure 4, and shows means for installing the framework at any desired angle in an automobile body.

Figure 1:
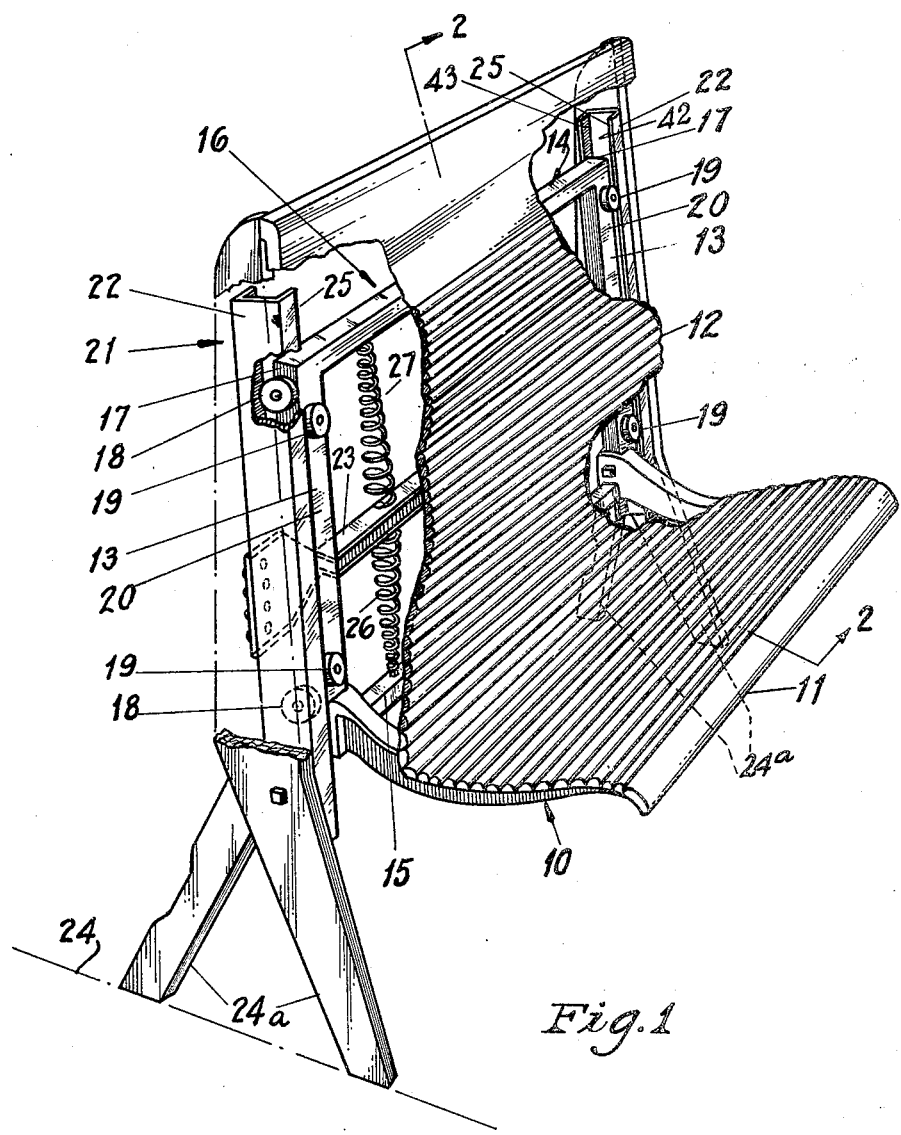
Figure 1 is a fragmentary perspective view of a shockless unitary seat structure embodying the invention as installed in buses.

In the illustrated embodiments of the invention, the several views show a unitary vehicle seat 10, comprising a seat bottom 11, and a back-rest 12, rigidly fastened together. Rearwardly of the back-rest 12 there has been provided a rectangular back-rest frame 16, comprising upright side strips each being in the form of a U-shaped channel 13, an upper cross-member 14 and a lower cross-member 15 positioned in spaced level planes. As best shown in Figure 3, there have been mounted on the end walls 17, 17, of the channels 13, 13, upper and lower anti-friction rollers 18, 18, the bearing faces of which are parallel to the front and rear faces of the back-rest 12. Four anti-friction rollers 19, 19, being also mounted on the front walls 20, 20, of the channels 13, 13, in right angular relation to the rollers 18, 18.

At the rear of the back-rest frame 16, there has been provided a stationary H-shaped frame 21, comprising uprights 22, 22, fastened together by a cross member 23. The uprights 22, 22, are each in the form of a U-shaped channel, said channels being positioned with the flange edges 25, 25, facing each other. The uprights 22, 22, may be extended down and fixed to the floor 24, of a vehicle in any suitable manner such as by means of the side supports 24, 24ª. The inner faces 42, 43, of the channel-shaped uprights 22, 22, form front and rear guide tracks for the roller bearings 18, 18. It will thus be noted that the relative motion between the back-rest frame 16, and the H-shaped frame 21, is facilitated by the roller bearings 18, 18, and confined between the inner faces 42, 43, of the flanges of the uprights 22, 22. In the embodiments shown, the roller bearings 19, 19, contact with the said flange edges 25, 25, which form guide tracks that are laterally positioned with respect to the said front and rear guide tracks 42, and 43, and which also confine the relative motion between the back-rest frame 16, and the stationary H-shaped frame 21.

The seat 10 and back-rest frame 16, are resiliently supported from the frame 21 by means of upper and lower helical, conically-shaped open coil compression springs 26, 26 and 27, 27; the small end of each of the lower springs 26, 26, being levelled and fastened to the lower cross member 15 in the movable back-rest frame 16, and the large end being levelled and fastened to the cross member or supporting axis 23 in the stationary frame 21. The upper set of helical conically-shaped open coil compression springs 27, 27, have their small ends levelled and fastened to the upper cross member 14 in the movable back-rest frame 16, and the large end being fastened to the cross member 23 in the stationary frame 21. It will be noted that the far ends of the upper springs as well as the far ends of the lower springs terminate in respective horizontal planes and tend to support the seat in a level plane. The upper springs 27, 27 act in compression for absorbing the downward thrust, while the lower springs 26, 26, are opposed to the upper springs 27, 27, and act in compression for checking the rebound of the upper springs, and the resultant effect is a mutual damping of the oscillations in both directions and added comfort for the passengers. As best shown in Figure 3, the upper and lower sets of springs are mounted in the same vertical plane and spaced apart in opposed pairs, each pair of springs having a common axis. The upper and lower springs are initially compressed, and, when, due to irregularities in the roadway, the vehicle is suddenly displaced upwardly, the upper springs 27, 27, become additionally compressed, the lower springs 26, 26, at the same time becoming relieved of an equal amount of their initial compression. The additional compression absorbed by the upper set of springs is in direct proportion to the amount of movement of the vehicle body. At the moment of rebound, the action is reversed and the lower springs 26, 26, are fully open and ready to check the reverse motion of the vehicle seat. It is to be noted that as an alternative, both sets of springs may be closed coil springs and initially in tension and produce an equivalent result. I prefer to use conically-shaped helical springs so as to provide a supporting structure giving initial softness for light weight passengers. Also, the widening or increasing the diameter of the coil springs at one end gives the springs more stability in their vertical position and prevents buckling.

Referring to Figure 4, it will be noted that there is a similarity in the action of the movable framework about the supporting axis, to the action of the fibers of a loaded simple beam about its neutral axis, insofar as the constant action and reaction of the opposed springs on opposite sides of the supporting axis dampen the oscillations and there is a tendency to maintain the passengers in a horizontal plane irrespective of the irregularities in the roadway.

As shown in Figure 5, there has been provided a modified form of back-rest frame 28, comprising uprights 29, 29, connected together by a cross-member 30. The frame 28 is provided with anti-friction rollers 31, 31, which are adapted to move in U-shaped side walls 32, 32, of a stationary frame 33. The frame 33 may be fixed to the floor of a vehicle by means of side supports in the manner shown in Figure 1. The back-rest frame 28 is resiliently supported from the frame 33 by means of helical springs 34, 34 and 35, 35, similar to that shown in Figure 4. The frame 28 is also provided with anti-friction rollers 36, 36, mounted in right-angular relation to the rollers 31, 31, the seat 10 in this form of construction being attached to the frame 28.

As shown in Figure 6, the upright 22 of the stationary frame 21 is mounted on a pivot 37 carried by an angle iron 38, which is fastened to the vehicle body 39. The frame 21 is thus adapted to be tilted at any angle in the automobile body and may be fastened to the body by means of an angle iron 40 mounted on a pivot 41.

It is to be noted that Figures 1, 2, 3, 4 and 5 show the application of the structure as applied to a bus seat. Figure 6 shows the application of the same structure to the rear seat of an automobile. The dotted lines in vertical position show the application for truck driver's seat or drivers' seats in taxi cabs; also showing adjustable mode of attachment to the vehicle at any angle to suit vehicle body.

My improved seat is particularly adapted for automobiles and railroad cars, but may be used for other kinds of vehicles in which the passengers are subjected to shocks and disturbances. Upon actual trial it is found that the unpleasant sensation and fatigue incident to riding in vehicles having stiff spring action or riding over bumpy roadways is completely eliminated.

It is thus readily seen that there has been provided a spring supported unitary bench seat which is confined for vertical movement on all sides and which meets the demand of the motive vehicle industry for a practical shockless non-jamming multiple passenger bench seat.

Having thus described my invention, what I claim as new and desire to secure by Letters Patent of the United States is as follows:

1. In a multiple-passenger bench seat structure, the combination of an elongated unitary seat and back rest frame slidably housed in a stationary frame for vertical movement, said stationary frame being designed to be fastened to a floor and comprising two spaced channels positioned with the flange edges facing each other and providing guide tracks on the inner faces and on the edges of the flanges, rollers fixedly mounted at the corners of said back rest frame and disposed in rolling engagement with flange edges of said channels and further rollers fixedly mounted at the corners of said back rest frame and disposed between the inner faces of the flanges of said channels, said further rollers being of a diameter substantially equal to the distance between the said inner faces, said edge-contacting rollers being in right-angular relation with said further rollers, said back rest frame being guided in its vertical movement in the stationary frame on all sides.

2. A multiple-passenger bench seat comprising an elongated seat bottom and back rest mounted on a rectangular back rest frame, said back rest frame being slidably housed and resiliently supported for upright oscillations in an H-shaped stationary frame, said stationary frame being designed to be fastened to a floor and comprising two spaced upright channels positioned with the flange edges facing each other and providing guide tracks on the inner faces and on the edges of the flanges, four sets of rollers being mounted at the corners of said back rest frame, each set comprising two rollers set at right angles to each other, four of said rollers being in engagement with the said inner face guide tracks and the other four rollers being in engagement with the guide tracks on the edges of the flanges, said resilient support comprising a plurality of longitudinally spaced abutting upper and lower opposedly compressed conical coil springs positioned above the seat level in the same vertical plane, said springs having their ends leveled and having one end of each spring fixed to the cross member of said H-shaped stationary frame and the other ends of said upper and lower springs terminating respectively in spaced horizontal planes in the back rest frame and fastened thereto, thereby tending to support the seat in a level plane and mutually damping the said oscillations.

Signed at New York, in the county of New York and State of New York, this 15th day of October, A. D. 1930.

LEONARD B. HARRIS.